UNITED STATES PATENT OFFICE.

WILLIAM SOMERVILLE, OF AUBURN, VICTORIA, AUSTRALIA.

DYE OR STAIN.

1,193,838. Specification of Letters Patent. Patented Aug. 8, 1916.

No Drawing. Application filed December 15, 1915. Serial No. 66,966.

*To all whom it may concern:*

Be it known that I, WILLIAM SOMERVILLE, manufacturer, a subject of the King of Great Britain, residing at 26 Havelock road, Auburn, in the State of Victoria, Commonwealth of Australia, have invented certain new and useful Improvements in New or Improved Dyes or Stains, of which the following is a specification.

This invention relates to a new or improved dye or stain for use more especially in dyeing or coloring fabrics of woolen, cotton or silk, but it is equally applicable for dyeing or staining paper, straw board, wood and the like.

A dye or stain obtained according to this invention consists of the product obtained by treatment of the resins of the grass tree (which is native to Australia and botanically known as *Xanthorrhœa*) with a solution of an alkali (such as caustic soda or sodium carbonate). The resultant liquor after removing the solid and undissolved matter may be used direct for effecting the necessary dyeing or coloring or the dye prepared in the solid form for convenience in handling and subsequent use by dissolving in water.

In proceeding to the manufacture of a dye or stain according to this invention I take a quantity of the resins or caudex obtained from the species colloquially known in Australia as "grass tree" (botanically known as *Xanthorrhœa*) and subject the same to treatment with a solution containing the requisite amount of alkali (such as caustic soda, carbonate of soda or the like). The solution of alkali may be of any suitable strength but I find in practice that a solution of from 1 to 10% well answers the purpose. The amount of alkali required varies for the different resins obtained from the different species of grass tree (*Xanthorrhœa*.) If necessary the action of the alkali upon the resin may be accelerated by heating at a temperature preferably not exceeding 45° C. It is desirable that the resultant liquor should be only slightly alkaline. Any excessive alkalinity may be removed by the addition of further quantities of the original resin. The resultant liquor is then filtered for the removal of the solid undissolved matter and the filtrate used for dyeing in the ordinary way. In some cases the liquor may be used direct without the above filtration where the presence of the solid matter would not interfere with the dyeing operation. When it is desired to produce the dye in a solid form (as being more convenient for transport and handling) the resin is first cleaned or separated mechanically as far as practicable from the fibrous matter and is then treated with a strong concentrated solution containing the requisite amount of alkali (such as caustic soda or sodium carbonate) and after the reaction is completed the liquor is concentrated by heating at a temperature not exceeding 100° C. until a sample indicates that the product will just solidify on cooling. This material may be subsequently dissolved in cold water and used as a dye in the ordinary way.

For the purpose of illustrating this invention I will now proceed to describe a specific procedure for the manufacture of this improved dye or stain but it will be understood that I do not wish to confine myself to any precise quantities or proportions of materials nor to the strength of solutions used. To an amount of 100 lbs. of resin as before described I add 40 lbs. of caustic soda which has been previously dissolved in 20 gallons of water and maintain the same at a temperature preferably not exceeding 45° C. until the reaction is complete. The resultant liquor contains the dye in solution and after having been separated from the solid matter by filtration may be diluted to the required extent according to the depth of shade required. When it is desired to obtain the dye in a solid or more or less plastic form I prepare a mixture of 50 parts by weight of the resin separated as far as practicable from the fibrous matter, 20 parts by weight of caustic soda and 30 parts by weight of water. This mixture is heated at a temperature preferably not exceeding 45° C. until the reaction is completed when it may be further heated at a temperature not exceeding 100° C. until the required consistency is obtained which may be ascertained by taking a sample and allowing the same to cool. In this way the dye may be prepared in a solid or semi-plastic condition as may be most convenient for handling and may be subsequently used by dissolving in cold or warm water as required.

In practice the dye is prepared as above indicated and is used in the ordinary way, different strengths being used for varying shades from yellow to brown. I have found that the dye by itself is very fast and permanent but I prefer to use the same in conjunction with known mordants (such as ferrous sulfate, ferric chlorid, ferric acetate, cupric sulfate, potassium bichromate, or ferric nitrate) which are employed in the same manner as is at present practised with other known dyes according to the particular shade and color required.

I claim;—

1. An improved dye or stain consisting of the product obtained by the treatment of the resin of the species known as "grass tree" (and botanically known as *Xanthorrhœa*) with a solution of an alkali.

2. An improved dye or stain consisting of the product obtained by the treatment of the resin of the species known as "grass tree" (and botanically known as *Xanthorrhœa*) with a solution of an alkali and separating the solid matters therefrom by filtration or otherwise substantially as described.

3. An improved dye or stain consisting of the product obtained by the treatment of the resin of the species known as "grass tree" (and botanically known as *Xanthorrhœa*) with a solution of an alkali and heating the mixture until the required consistency is obtained substantially as described.

4. An improved dye or stain consisting of the product obtained by the treatment of the resin of the species known as "grass tree" (and botanically known as *Xanthorrhœa*) with a solution of an alkali and subsequently using the same in conjunction with known mordants substantially as described.

In testimony whereof I have affixed my signature in presence of two witnesses.

WILLIAM SOMERVILLE.

Witnesses:
Wm. A. Hack,
J. L. Cullen.

Copies of this patent may be obtained for five cents each, by addressing the "Commissioner of Patents, Washington, D. C."